United States Patent
Knoll et al.

(10) Patent No.: US 9,556,920 B1
(45) Date of Patent: Jan. 31, 2017

(54) PLANAR FLEXURE MEMBERS AND ACTUATORS USING THEM

(71) Applicants: Matthew Knoll, San Francisco, CA (US); Jonathan Bond, Melrose, MA (US); Robert White, Roslindale, MA (US); Umberto Scarfogliero, Boston, MA (US); Andrew Wallace, Needham, MA (US)

(72) Inventors: Matthew Knoll, San Francisco, CA (US); Jonathan Bond, Melrose, MA (US); Robert White, Roslindale, MA (US); Umberto Scarfogliero, Boston, MA (US); Andrew Wallace, Needham, MA (US)

(73) Assignee: Rethink Robotics, Inc., Boston, MA (US)

( * ) Notice: Subject to any disclaimer, the term of this patent is extended or adjusted under 35 U.S.C. 154(b) by 0 days.

(21) Appl. No.: 14/806,807

(22) Filed: Jul. 23, 2015

(51) Int. Cl.
  *F16D 3/52* (2006.01)
  *F16F 1/02* (2006.01)
  *F16D 3/12* (2006.01)
  *F16D 3/79* (2006.01)

(52) U.S. Cl.
  CPC .............. *F16F 1/027* (2013.01); *F16D 3/12* (2013.01); *F16D 3/79* (2013.01)

(58) Field of Classification Search
  CPC ............... F16F 1/027; F16D 3/12; F16D 3/79
  USPC ........... 464/58, 59, 77, 84, 98, 101; 267/161
  See application file for complete search history.

(56) References Cited

U.S. PATENT DOCUMENTS

| | | | | | |
|---|---|---|---|---|---|
| 2,127,688 | A | * | 8/1938 | Hoerbiger | F16K 15/10 267/161 X |
| 2,947,529 | A | * | 8/1960 | Schwartz | F16F 1/32 267/161 |
| 4,317,339 | A | * | 3/1982 | Schmidt | F16D 3/78 464/98 X |
| 4,480,736 | A | * | 11/1984 | Loizeau | F16F 15/1212 464/77 X |
| 5,147,246 | A | * | 9/1992 | Focqueur | F16F 15/1213 464/59 X |
| 8,876,094 | B1 | * | 11/2014 | Ridgeway | F16F 1/34 267/161 X |
| 9,183,975 | B2 | * | 11/2015 | Aigner | F16F 1/10 |
| 2016/0102724 | A1 | * | 4/2016 | Potter | F16F 1/027 267/161 |

* cited by examiner

*Primary Examiner* — Gregory Binda
(74) *Attorney, Agent, or Firm* — Morgan, Lewis & Bockius LLP

(57) ABSTRACT

A planar flexure member for resisting rotation about a central axis thereof includes, in various embodiments, a central portion comprising a plurality of attachment points; and at least one serpentine flexure arm extending from the central portion in a plane. The arm(s) terminate in an arcuate mounting rail that includes a series of attachment points. The rails are positioned in opposition to to each other to partially define and occupy a planar circular envelope radially displaced from but surrounding the central portion of the flexure member. A portion of the serpentine arms may extend to (or substantially to) the envelope between the mounting rails.

17 Claims, 4 Drawing Sheets

PLANAR FLEXURE MEMBERS AND ACTUATORS USING THEM

TECHNICAL FIELD

The present invention relates to elastic flexure elements and actuators employing these elements for use, for example, in robotic applications.

BACKGROUND

Industrial robots perform a variety of tasks involving the movement and manipulation of various objects. A typical industrial robot as used, e.g., in a manufacturing environment, may have one or more arms equipped with grippers that allow the robot to pick up, transport, and manipulate objects. A key mechanical requirement for industrial is the ability to generate large but precise forces and torques while maintaining overall control stability. These torques and forces are generated by actuators, i.e., motors responsive to control signals to apply a commanded torque, which is transmitted mechanically to a load either directly (where rotational actuation is required) or via a linear conversion element, such as a lead screw (when linear force is required).

Stiff actuators can exert large forces from small joint displacements, and permit high-bandwidth force control and precise position control. But stiffness makes force control difficult. Because of the importance of force control in robotic applications, stiffness and the attendant bandwidth is typically sacrificed to achieve better force control. One approach is to utilize an elastic element in series with the actuator. Elasticity has the effect of making the force control easier, as larger deformations are needed to exert a given force relative to a stiff actuator. robot. In effect, the elasticity allows force to be controlled via position rather than directly, which improves accuracy and stability, and reduces noise.

Designing series elastic elements for robotic applications can be challenging due to space constraints, the need to withstand large and repeated applied torques without slippage or wander, and the need for repeatable but economical manufacture. In a rotational elastic element, for example, the design must incorporate components with sufficient length to provide the desired elasticity (since stiffness varies inversely with the cube of a component's length), but must also provide a secure mounting frame to avoid slippage. Because the frame typically defines the outer envelope of the elastic element, it imposes a limit on the amount of internal length that may be employed.

SUMMARY

The present invention provides, in various embodiments, a planar flexure member for resisting rotation about a central axis thereof that affords greater compliance than conventional designs. In various embodiments, the flexure member comprises a central portion comprising a plurality of attachment points; and at least two serpentine flexure arms extending oppositely and symmetrically from the central portion in a plane, each of the arms terminating in an arcuate mounting rail, the mounting rails each comprising a plurality of attachment points and being positioned in opposition to to each other to partially define and occupy a planar circular envelope radially displaced from but surrounding the central portion, a portion of the serpentine arms extending substantially to the envelope between the mounting rails.

In some embodiments, the serpentine arms have a varying thickness with a thinnest portion thereof at the envelope. The arms and the central portion may have a unitary height at least equal to the width of the arms at a narrowest portion thereof. For example, the ratio of height to width may be at least 2. In other embodiments, the arms and the central portion have a non-unitary height.

The flexure member may be made of titanium or other suitable metal (or other material). In some implementations, the arms (or portion thereof) have an I-beam cross-section. The arms may alternatively or in addition include voids along a neutral bending axis thereof.

In another aspect, the invention pertains to a planar flexure member for resisting rotation about a central axis thereof. In various embodiments, the flexure member includes a central portion comprising a plurality of attachment points; and at least one serpentine flexure arm extending from the central portion in a plane and terminating in an arcuate mounting rail having a plurality of attachment points.

In still another aspect, the invention relates to a rotary actuator. In various embodiments, the actuator comprises a motor configured for rotation about an actuation axis; and a planar flexure member having a central output portion mechanically coupled to a load and at least two serpentine flexure arms extending oppositely and symmetrically from the central portion in a plane, each of the arms terminating in an arcuate mounting rail having a plurality of attachment points for mounting to the motor, the mounting rails being positioned in opposition to each other to partially define and occupy a planar circular envelope radially displaced from but surrounding the central portion, a portion of the serpentine arms extending substantially to the envelope between the mounting rails.

In some embodiments, the serpentine arms have a varying thickness with a thinnest portion thereof at the envelope. The arms and the central portion may have a unitary height at least equal to the width of the arms at a narrowest portion thereof. For example, the ratio of height to width may be at least 2. In other embodiments, the arms and the central portion have a non-unitary height. The flexure member may be made of titanium or other suitable metal (or other material). In some implementations, the arms (or portion thereof) have an I-beam cross-section. The arms may alternatively or in addition include voids along a neutral bending axis thereof.

In some embodiments, the actuator has an actuation axis coaxial with an output axis. In other embodiments, the actuator has an actuation axis parallel to and offset with respect to an output axis, or oblique with respect to an output axis.

The term "substantially" or "approximately" means ±10% (e.g., by weight or by volume), and in some embodiments, ±5%. The term "consists essentially of" means excluding other materials that contribute to function, unless otherwise defined herein. Nonetheless, such other materials may be present, collectively or individually, in trace amounts. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. The headings provided herein are for convenience only and are not intended to limit or interpret the scope or meaning of the claimed technology.

BRIEF DESCRIPTION OF THE DRAWINGS

The foregoing will be more readily understood from the following detailed description of the invention, in particular, when taken in conjunction with the drawings, in which.

DETAILED DESCRIPTION

Figure 1:
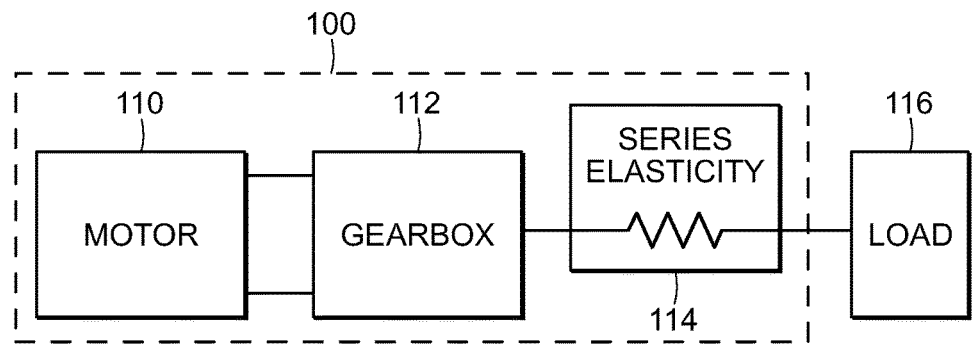
FIG. 1 schematically illustrates a representative actuator system employing an embodiment of the invention.

FIG. 1 illustrates the basic components of an actuator system 100 that incorporates a flexure element in accordance herewith. The system 100 includes a torque-generating device, i.e., a motor 110, which may optionally be geared via a gearbox 112 (which lightens the system by facilitating use of a smaller motor 110 operating at higher speeds). The gearbox 112 may be integral to or separate from the motor 110. A torsional spring element 114 is linked in series with the output of the gearbox 112, or if no gearbox is employed, directly with the motor 110. The load 116 to be acted upon by the actuator system 100 is linked in series to the other end of spring element 114. The spring element 114 thereby introduces at the interface between the actuator 100 and the load 116 a series elasticity that affords precise control of the force applied to the load. The spring element 114 may be linked to the load 116 through a low-backlash transmission element (not shown) if desired.

In a robot environment, the axial distance between the actuator system 100 and the load 116 may be tightly constrained, limiting the thickness of the spring element 114. The radial extent of the actuator system 100 may also be highly constrained, limiting the envelope diameter of the spring element. Hence, it is essential to pack the desired degree of stiffness into a small spatial region, while at the same time providing for sufficiently secure mounting of the spring element 114 to the gearbox 112 and the load 116 (or other mechanical output) to avoid slippage and wander.

Figure 2A:
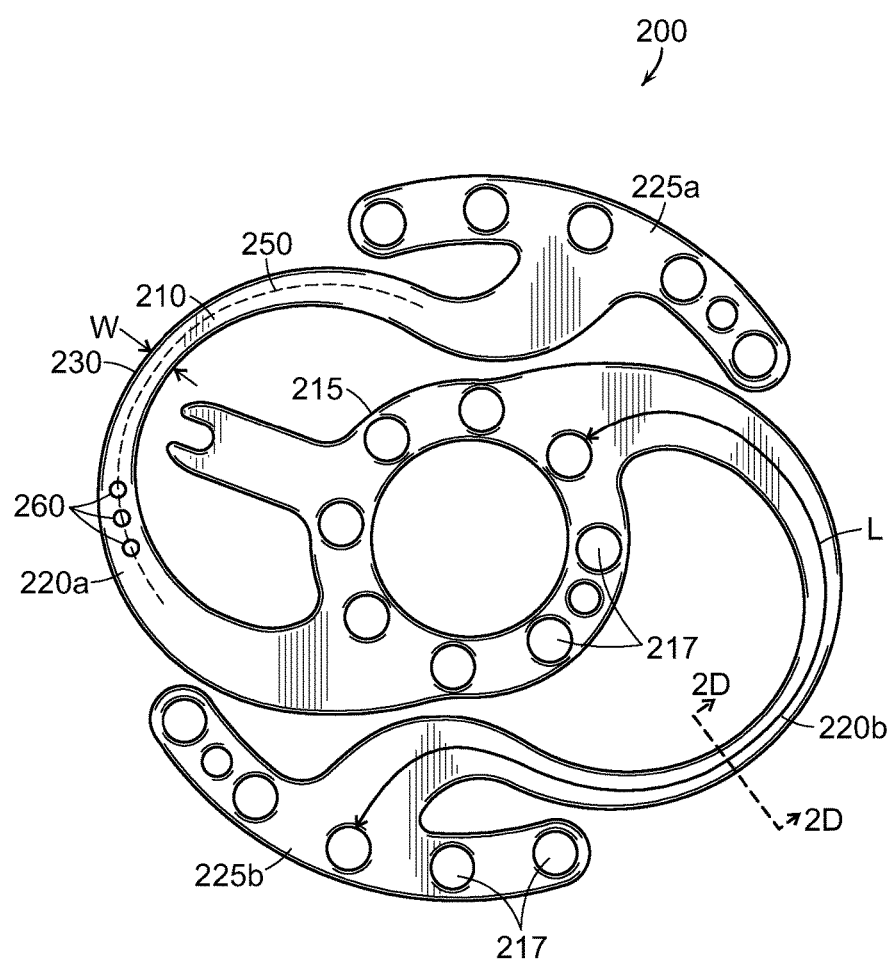
FIGS. 2A and 2B illustrate, respectively, perspective and sectional views of a planar flexure member in accordance with embodiments of the present invention. The width w and length L of the flexure arms of the member are indicated on FIG. 2A, as is the neutral bending axis of the flexure arm (dashed line). The thickness h of the central portion is indicated on FIG. 2B, as is the thickness $h_a$ of the flexure arms.
Figure 2B:
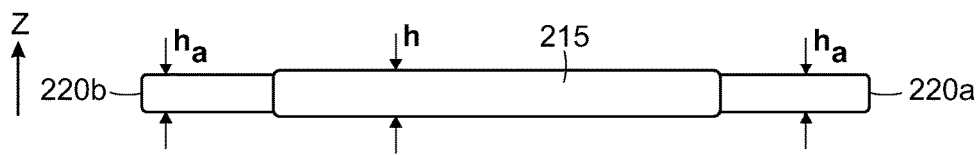

A representative elastic element fulfilling these contradictory constraints is shown in FIGS. 2A and 2B. The flexure member 200 is a planar structure having generally flat opposed surfaces, the visible one of which is indicated at 205. A central portion 215 includes a plurality of attachment points 217—i.e., mounting holes arranged in a generally circular configuration and typically spaced equidistantly apart. The attachment points 217 accommodate screws or other fasteners that secure the flexure member 200 to the actuator motor or gearbox as described earlier.

Figure 3A:
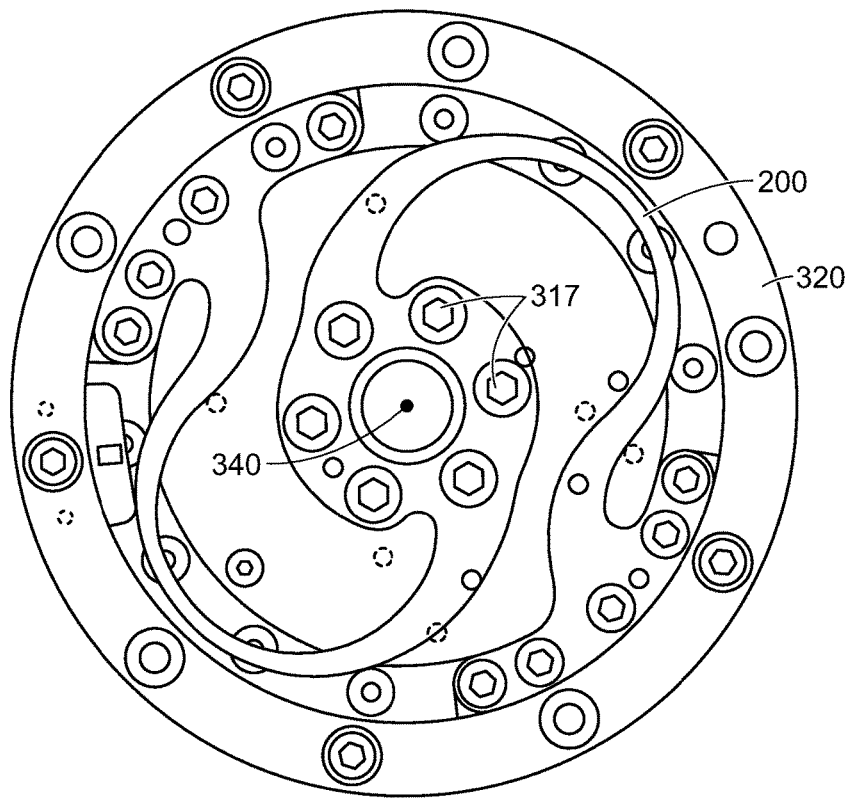
FIGS. 3A and 3B are plan and sectional views, respectively, of a representative deployment of the flexure member shown in FIGS. 2A and 2B in which the actuation axis of the actuator in which the flexure member is deployed is coaxial with the output axis. Some components are omitted for clarity in FIG. 3A.

Emanating from the central portion 215 are a pair of serpentine flexure arms 220a, 220b, which extend oppositely and symmetrically from the central portion 215 in a plane. Although two arms 220 are shown, it should be understood that configurations utilizing a single arm 220, as well as more than two arms 220, are within the scope of the invention. The width w of the arms 220 (which may change along the length of the arms), as well as the length L of the arms 220 are indicated in FIG. 2A. In the illustrated embodiment, each of the arms 220a, 220b terminates in an arcuate mounting rail 225a, 225b. Each of the mounting rails 225 includes a plurality of attachment points 217 (mounting holes, once again, in the illustrated embodiment) that facilitate attachment of the flexure member 200 to the load or the drive. As best seen in FIG. 3A, described in greater detail below, the mounting rails 225 are positioned in opposition to define, along with the outer curved segments of the flexure arms 220, a substantially circular outer envelope for stability and symmetry of rotative force transmission. Because the mounting rails 225 occupy only a portion of the circular envelope, the flexure arms may extend outwardly so that the outer curved edges meet or approach the envelope. In this way, the lengths of the flexure arms 220 may be maximized within a limited circular area—i.e., their lengths are not constrained to fit inside a fully circular mounting collar.

Figure 2C:
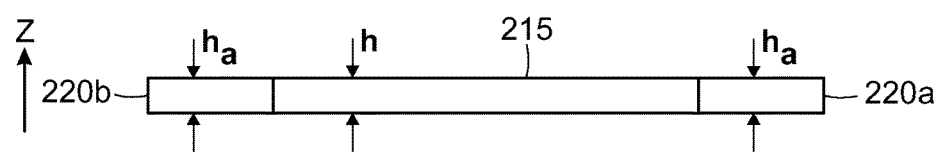
FIG. 2C is a sectional view of a planar flexure member in accordance with embodiments of the present invention in which the thickness h of the central portion is the same as the thickness $h_a$ of the flexure arms.

With reference to FIG. 2B, the flexure member 200 has a height h, which depends, in various embodiments, on the size of the actuator. Furthermore, although the flexure member 200 is planar, the height h may vary—that is, different regions of the flexure member 200 may have different thicknesses. For example, FIG. 2B depicts an embodiment in which the height h of the central portion 215 of flexure member 200 is greater than the height $h_a$ of the arms 200. A representative range of heights is 2.5 to 9 mm. Where the height varies, a typical configuration has the thinnest (lowest $h_a$) portion of the arms 220 at the outer edges thereof. Where the arms 220, the central portion 215 and the rails 225 have a unitary height, that height may be at least equal to the width of the arms at a narrowest portion thereof, representatively indicated at 230 in FIG. 2A; in one illustrative implementation, the ratio of height to width is 2:1. FIG. 2C depicts an embodiment in which the height h of the central portion 215 of flexure member 200 is equal to the height $h_a$ of the arms 200, i.e., the central portion 215 and the arms 200 have a unitary height.

The arms 220 provide the elasticity of the flexure member 200. That is, as the central portion 215 is rotated, rotary force is transmitted to the arms 220. The outside of the flexure member 200 is attached to the gearbox 112 (see FIG. 1). The arms 220 elastically deform to a degree dependent on the torque applied to the central portion 215 and the reaction force of the load. The elasticity of the flexure member 200 depends on the modulus of the material from which the flexure member is fabricated as well as the lengths and thicknesses of the arms 220. In particular, each of the arms 220 may be approximately modeled as a cantilever beam with a stiffness k given by $$k = \frac{Eh_a w^3}{4L^3}$$

where E is the Young's modulus of the flexure member 200, w is the cross-sectional width (radial dimension) of the arm shown in FIG. 2A, $h_a$ is the height (z-axis) of the arm shown in FIGS. 2B and 2C, and L is the length of the arm (from the central portion 215 to the mounting rail 225) shown in FIG. 2A.

Figure 2D:
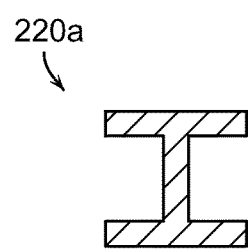
FIG. 2D is a sectional view, taken along line 2D-2D in FIG. 2A, of a flexure arm having an I-beam cross section in accordance with embodiments of the present invention.

Because of this relationship, z-axis arm thickness $h_a$ can be traded off against arm width w in the xy plane of the flexure member 200. If thickness is constrained by space limitations or machinability, in other words, a given reduction in thickness can be compensated for by a cubic increase in arm width in order to maintain the same stiffness. Although the cubic relationship implies a large areawise increase in the arm footprint to achieve a thickness reduction, in fact this increase is readily accommodated by the serpentine configuration, which leaves substantial open space within the envelope of the flexure member 200— space that is further increased by the limited-circumference mounting rails 225, which allow the outer edges of the arms 220 to be maximally spaced from the central portion 215. Other weight-reduction strategies may also be employed. For example, the arms may be shaped with an I-beam cross-section, as shown in FIG. 2D, to reduce the amount of material needed to achieve a given stiffness, or material may be removed along the neutral axis of bending 250 (e.g., voids or holes 260 may be formed along the neutral axis 250, as shown in FIG. 2A).

Indeed, wider arms can aid manufacturability, since narrow features can be difficult to fabricate. Typical approaches used in the manufacture of planar flexures include stamping, water-jet cutting, laser cutting, and machining Stamped parts can exhibit inferior edge quality and therefore durability limitations, and it can be difficult to retain complex feature shapes following heat treatment; hence slender, curved arm segments may be incompatible with stamping as a fabrication option. Water jet/laser cutting cutting generally has a low-end dimensional control of about 0.005" for materials suitable for flexure members as contemplated herein, and for flexures designed for small operating torques, this variation translates into very large stiffness variations, since stiffness varies with the cube of the dimensional error. Additionally, the cost of water jet/laser cutting is faily high compared with processes like extruding and slicing, and does not ramp to volume production easily. If desired, a finishing technique maybe employed to adjust the final mechanical properties of the flexure member 200. For example, peening (e.g., shot peening) is frequently used to introduce surface residual compressive stresses and thereby increase the durability of metal parts.

In general, an extrusion process followed by slicing into planar flexure elements is cost-effective and well-suited to embodiments of the present invention. A preferred material for the flexure element 200 is titanium, particularly when the flexure element is affixed to an aluminum load and/or rotor. The coeffiecient of friction between aluminum and titanium is higher than between steel and aluminum, reducing the possibility that the bolted joint will slip. Although a titanium flexure requires more material, the volume offset does not outweigh the density reduction titanium offers, and the net result is a lighter flexure. Titanium has a natural endurance limit in the same way steel does (though unlike many other materials) and therefore is well suited to elastic applications. Titanium has 60% of the stiffness of steel, which means that the flexure arms need to be a bit thicker relative to steel, reducing their sensitivity to tolerance variation. It should be noted that more than one flexure in accordance herewith may be stacked in various configurations to achieve balanced loading and the required torque deflection.

Figure 3B:
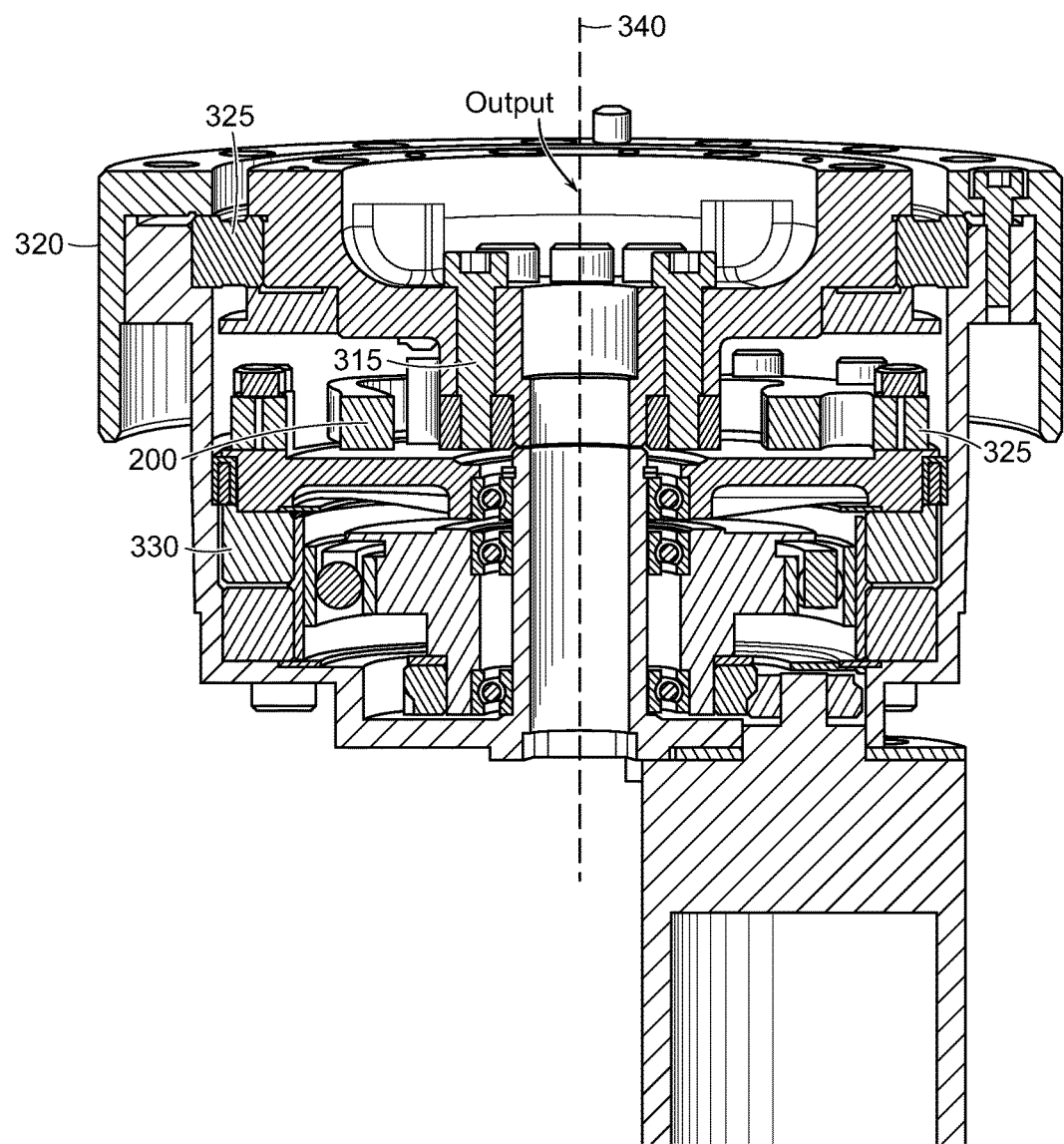

FIGS. 3A and 3B show the flexure element 200 coupled to a load in a representative mechanical environment. The load itself (not shown, but which may be, for example a robot arm) is coupled via bolts 315 passing through the central mounting holes of the flexure element 200. A circular frame 320 is mechanically coupled to the central portion of the flexure element 200 via cross roller bearings or a similar system. As is well understood in the art, crossed roller bearings comprise outer rings, inner rings, and rolling elements; they can also be metal spacers. Due to the crossed arrangement of the rolling elements, such bearings can support axial forces from both directions as well as radial forces, tilting moment loads and combinations of loads with a single bearing position. The outer rails 325 of the flexure element 200 are secured to a source of rotary power, such as a harmonic drive 330. Thus, the flexure element 200 transmits torque from the drive 330 to the system output, acting as a spring therebetween, and the actuation axis of the flexure element 200 and the output axis of the system are coaxial (indicated as axis 340 on FIGS. 3A and 3B).

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. In particular, embodiments of the invention need not include all of the features or have all of the advantages described herein. Rather, they may possess any subset or combination of features and advantages. Accordingly, the described embodiments are to be considered in all respects as only illustrative and not restrictive.

What is claimed is:

1. A planar flexure member for resisting rotation about a central axis thereof, the flexure member comprising:
    a central portion comprising a plurality of attachment points; and
    at least two serpentine flexure arms extending oppositely and symmetrically from the central portion in a plane, each of the arms terminating in an arcuate mounting rail, the mounting rails each comprising a plurality of attachment points and being positioned in opposition to each other to partially define and occupy a planar circular envelope radially displaced from but surrounding the central portion, a portion of the serpentine arms extending substantially to the envelope between the mounting rails.

2. The flexure member of claim 1, wherein the serpentine arms have a varying thickness with a thinnest portion thereof at the envelope.

3. The flexure member of claim 1, wherein the arms and the central portion have a unitary height, the height being at least equal to a width of the arms at a narrowest portion thereof.

4. The flexure member of claim 3, wherein a ratio of the height to the width is at least 2.

5. The flexure member of claim 1, wherein the arms and the central portion have a non-unitary height.

6. The flexure member of claim 1, wherein the flexure member is made of titanium.

7. The flexure member of claim 1, wherein at least a portion of the arms has an I-beam cross-section.

8. The flexure member of claim 1, wherein at least a portion of the arms has voids along a neutral bending axis thereof.

9. A rotary actuator comprising:
  a motor configured for rotation about an actuation axis; and
  a planar flexure member having a central output portion mechanically coupled to a load and at least two serpentine flexure arms extending oppositely and symmetrically from the central portion in a plane, each of the arms terminating in an arcuate mounting rail having a plurality of attachment points for mounting to the motor, the mounting rails being positioned in opposition to each other to partially define and occupy a planar circular envelope radially displaced from but surrounding the central portion, a portion of the serpentine arms extending substantially to the envelope between the mounting rails.

10. The actuator of claim 9, wherein the serpentine arms have a varying thickness with a thinnest portion thereof at the envelope.

11. The actuator of claim 9, wherein the arms and the central portion have a unitary height, the height being at least equal to a width of the arms at a narrowest portion thereof.

12. The actuator of claim 9, wherein a ratio of the height to the width is at least 2.

13. The actuator of claim 9, wherein the arms and the central portion have a non-unitary height.

14. The actuator of claim 9, wherein the flexure member is made of titanium.

15. The actuator of claim 9, wherein at least a portion of the arms has an I-beam cross-section.

16. The actuator of claim 9, wherein at least a portion of the arms has voids along a neutral bending axis thereof.

17. The actuator of claim 9, wherein the actuator has an actuation axis coaxial with an output axis.

* * * * *